United States Patent
Lin

(10) Patent No.: US 11,480,427 B2
(45) Date of Patent: Oct. 25, 2022

(54) STRUCTURED LIGHT PROJECTOR

(71) Applicant: TRIPLE WIN TECHNOLOGY(SHENZHEN) CO.LTD., Shenzhen (CN)

(72) Inventor: Zhe-Ming Lin, Shenzhen (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 0 days.

(21) Appl. No.: 17/335,716

(22) Filed: Jun. 1, 2021

(65) Prior Publication Data

US 2021/0385420 A1 Dec. 9, 2021

(30) Foreign Application Priority Data

Jun. 8, 2020 (CN) .......................... 202021034241.5

(51) Int. Cl.
  *G01B 11/25* (2006.01)
  *H04N 9/31* (2006.01)
  *G03B 21/28* (2006.01)
  *G03B 21/20* (2006.01)

(52) U.S. Cl.
  CPC ...... *G01B 11/2513* (2013.01); *G03B 21/2033* (2013.01); *G03B 21/28* (2013.01); *H04N 9/3161* (2013.01)

(58) Field of Classification Search
  CPC .............. G01B 11/2513; H04N 9/3161; G03B 21/2033; G03B 21/28
  See application file for complete search history.

(56) References Cited

U.S. PATENT DOCUMENTS

| 8,459,073 | B2 * | 6/2013 | Isei ...................... G01B 11/306 |
| | | | 72/11.8 |
| 9,857,167 | B2 * | 1/2018 | Jovanovski ........ G01B 11/2536 |
| 9,927,223 | B2 * | 3/2018 | Takao ..................... G01C 3/06 |
| 10,007,994 | B2 * | 6/2018 | Grunnet-Jepsen ...... G06T 7/521 |
| 10,323,930 | B1 * | 6/2019 | Bikumandla ........ G01B 11/024 |
| 10,523,917 | B2 * | 12/2019 | Zeng ...................... H04N 13/25 |
| 10,895,642 | B2 * | 1/2021 | Chen ....................... G01S 17/86 |
| 2010/0183197 | A1 * | 7/2010 | Aikawa .............. G01B 11/2513 |
| | | | 382/106 |
| 2012/0204614 | A1 * | 8/2012 | Isei ...................... G01B 11/303 |
| | | | 72/12.8 |
| 2016/0377417 | A1 * | 12/2016 | Jovanovski ........ G01B 11/2536 |
| | | | 348/136 |
| 2017/0186167 | A1 * | 6/2017 | Grunnet-Jepsen ... H04N 13/239 |
| 2018/0010903 | A1 * | 1/2018 | Takao ................... G01S 7/4816 |

(Continued)

*Primary Examiner* — Bao-Luan Q Le
(74) *Attorney, Agent, or Firm* — ScienBiziP, P.C.

(57) ABSTRACT

A structured light projector outputting light which is adapt to variations in distance between an object under test and the structured light projector can efficiently obtain data as to three dimensions of the object. The structured light projector includes a lens, an infrared laser source, a voice coil motor, a first camera, and a second camera. The infrared laser source can emit infrared light towards the voice coil motor, the first camera is movably housed in the voice coil motor. The voice coil motor can adjust a focal length of the first camera. The first camera is disposed on a transmission path of the infrared light, so that the infrared light enters the to-be-tested object. The second camera is disposed on the second surface, to receive light reflected by the to-be-tested object.

10 Claims, 2 Drawing Sheets

(56) References Cited

U.S. PATENT DOCUMENTS

2019/0007675 A1* 1/2019 Zeng ................ H04N 13/25
2019/0113621 A1* 4/2019 Chen ................ G01S 7/4815
2021/0334991 A1* 10/2021 Lee .................. G03B 17/54

* cited by examiner

STRUCTURED LIGHT PROJECTOR

FIELD

The subject matter herein generally relates to optical projection, and more particularly, to a structured light projector.

BACKGROUND

Structured light projectors include projectors and cameras. The projector projects light beam towards a to-be-tested object. The camera collects the light reflected by the to-be-tested object to form data as to the object. The data includes a position and a depth of the to-be-tested object. Thus, a three-dimensional data of the to-be-tested object can be obtained by analyzing the reflected light.

However, the light beam emitted from the structured light projector has a divergence angle, causing the light beam to fall in a speckled pattern on the to-be-tested object. The larger a distance between the to-be-tested object and the structured light projector, the larger is the speckled pattern on the to-be-tested object, which reduces the accuracy of the depth data. In addition, when the distance is large, a large portion of the speckled patterns do not even strike the to-be-tested object, causing an energy loss.

BRIEF DESCRIPTION OF THE DRAWINGS

Implementations of the present technology will now be described, by way of example only, with reference to the attached figures.

DETAILED DESCRIPTION

Figure 1:
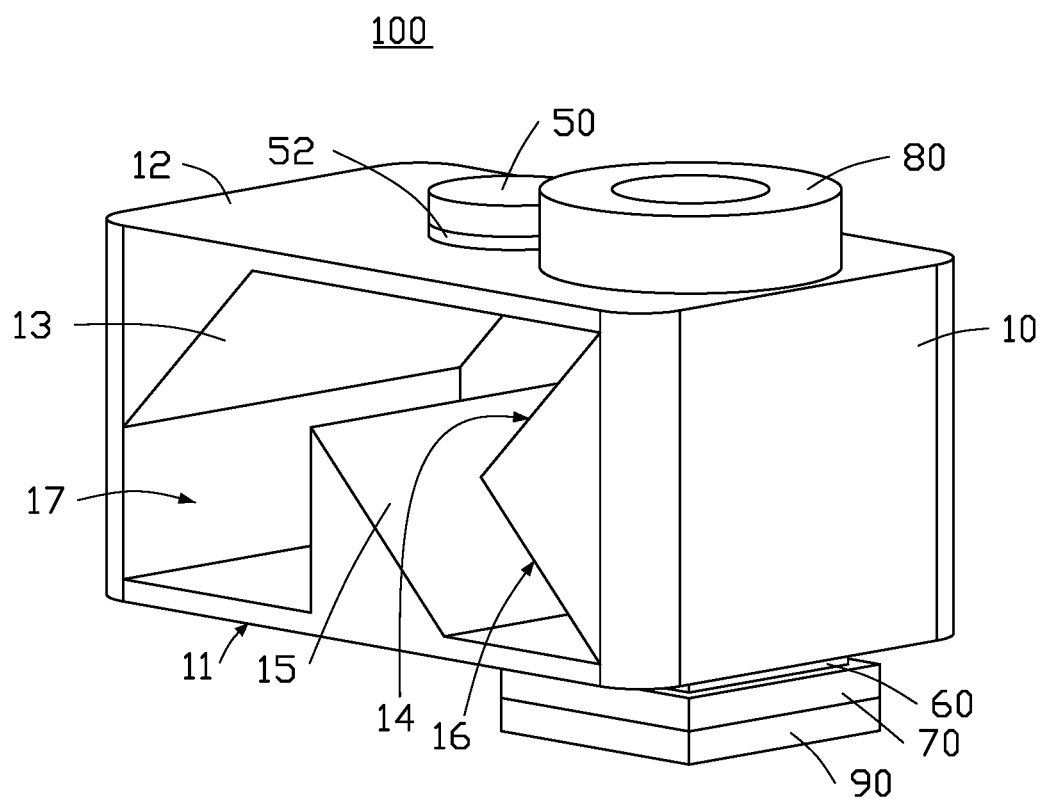
FIG. 1 is a diagrammatic view of an embodiment of a structured light projector according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict exists, the following embodiments and features in the embodiments can be combined with each other.

Figure 2:
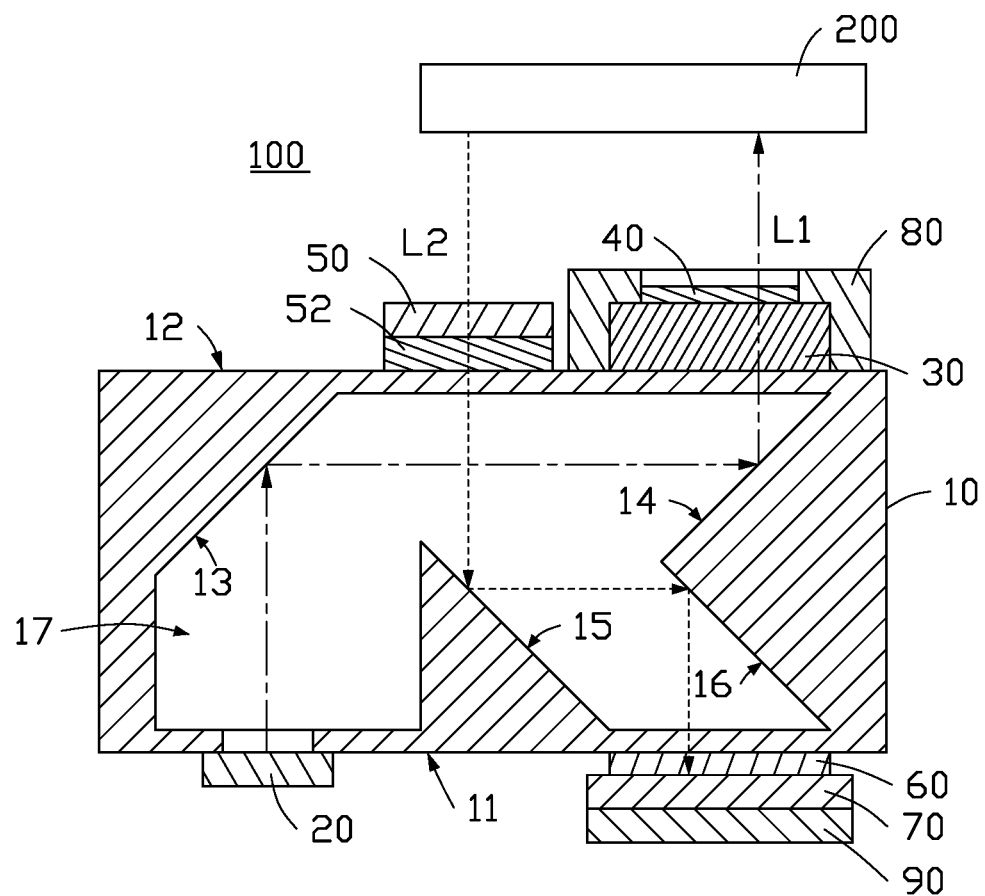
FIG. 2 is a cross-sectional view of the structured light projector of FIG. 1.

Referring to FIGS. 1 and 2, a structured light projector 100 includes a lens 10, an infrared laser source 20, a diffractive optical element 30 (DOE), a first camera 40, a second camera 50, a photosensitive chip 60, a processing chip 70, a voice coil motor 80, and a circuit board 90.

The structured light projector 100 can output a light (output light L1) towards a to-be-tested object 200 and receive light which is reflected (reflected light L2) from the to-be-tested object 200. The structured light projector 100 can then decode the reflected light L2 to obtain a three-dimensional data of the to-be-tested object 200.

The diffractive optical element 30, the voice coil motor 80, and the first camera 40 are sequentially disposed on a transmission path of the output light L1. The second camera 50, the photosensitive chip 60, and the processing chip 70 are sequentially disposed on a transmission path of the reflected light L2.

The lens 10 includes a first surface 11 and a second surface 12 provided opposite to the first surface 11. The first surface 11 is parallel to the second surface 12. The lens 10 can change the transmission path of the output light L1 and the reflected light L2 and adjust a transmission distance of the output light L1 and the reflected light L2.

The lens 10 defines a cavity 17. The lens 10 includes a first mirror surface 13, a second mirror surface 14, a third mirror surface 15, and a fourth mirror surface 16 at the cavity 17. The first mirror surface 13, the second mirror surface 14, the third mirror surface 15, and the fourth mirror surface 16 are disposed inside the lens 10. The first mirror surface 13 is parallel to the second mirror surface 14, and the second mirror surface 14 faces the first mirror surface 13. The third mirror surface 15 is parallel to the fourth mirror surface 16, and the fourth mirror surface 16 faces the third mirror surface 15. Each of the first mirror surface 13, the second mirror surface 14, the third mirror surface 15, and the fourth mirror surface 16 refers to a surface with a light reflective function. Since the output light L1 and the reflected light L2 are reflected by a number of mirror surfaces in the lens 10, the transmission path of the output light L1 and the reflected light L2 can be changed as required, which reduces the overall size of the structured light projector 100.

An angle between the first mirror surface 13 and the first surface 11 is 45 degrees, and an angle between the second mirror surface 14 and the first surface 11 is 135 degrees. That is, the first mirror surface 13 is parallel to the second mirror surface 14. An angle between the third mirror 15 and the second surface 12 is 45 degrees, and an angle between the fourth mirror 16 and the second surface 12 is 135 degrees. That is, the third mirror surface 15 is parallel to the fourth mirror surface 16.

The infrared laser source 20 is disposed on the first surface 11. The infrared laser source 20 can emit infrared light. The diffractive optical element 30 is disposed in the voice coil motor 80, and between the first camera 40 and the second surface 12. The diffractive optical element 30 diffracts the infrared light. The voice coil motor 80 is disposed on a surface of the diffractive optical element 30 away from the second surface 12, and the first camera 40 is movably accommodated in the voice coil motor 80. The voice coil motor 80 can adjust a focal length of the first camera 40. The first camera 40 is disposed on the voice coil motor 80 away from the diffractive optical element 30. The diffracted infrared light can pass through the first camera 40.

The second camera 50 is disposed on the second surface 12. The second camera 50 receives the reflected light L2. The photosensitive chip 60 is located between the first surface 11 and the processing chip 70. The photosensitive chip 60 converts the reflected light L2 into an electrical signal and transmits the electrical signal to the processing chip 70. The processing chip 70 then decodes the electrical signal. In this embodiment, the photosensitive chip 60 is a complementary metal oxide semiconductor (CMOS) sensor. The processing chip 70 is disposed on the photosensitive chip 60 away from the lens 10.

The circuit board 90 is disposed on the processing chip 70 away from the photosensitive chip 60. The circuit board 90 is electrically connected to the infrared laser source 20, the diffractive optical element 30, the first camera 40, the second camera 50, the photosensitive chip 60, the processing chip 70, and the voice coil motor 80.

The infrared light emitted by the infrared laser source 20 is perpendicular to the first surface 11, that is, an angle between the infrared light and the first mirror 13 is 45 degrees. The first mirror 13 reflects the infrared light to the second mirror 14. An angle between the infrared light reflected by the first mirror surface 13 and the second mirror surface 14 is 45 degrees. The second mirror 14 reflects the infrared light to the diffractive optical element 30. The diffractive optical element 30 diffracts the infrared light into a number of infrared light beams and directs the infrared light beams to the first camera 40. The infrared light beams pass through the first camera 40 to form speckled patterns on the to-be-tested object 200.

The speckled patterns illuminate the to-be-tested object 200 and are reflected by the to-be-tested object 200 as reflected light L2. The reflected light L2 passes through the second camera 50, and then is sequentially reflected by the third mirror surface 15 and the fourth mirror surface 16 towards the photosensitive chip 60. The photosensitive chip 60 decodes the reflected light L2 to obtain decoded data and transmits the decoded data to the processing chip 70. The processing chip 70 controls the voice coil motor 80 to adjust the focal length of the first camera 40 and records a value of current applied to the voice coil motor 80 when the first camera 40 and the to-be-tested object 200 are at a required distance. The processing chip 70 obtains data so that a depth of the to-be-tested object 200 is according to the value of current. The photosensitive chip 60 also recognizes a data of the to-be-tested object 200 so that a two-dimensional appearance is obtained. The three-dimensional data of the to-be-tested object 200 can be obtained based on the depth data and the two-dimensional data.

The structured light projector 100 further includes an infrared filter 52. The infrared filter 52 is disposed between the second camera 50 and the lens 10. The infrared filter 52 can filter the infrared light in the reflected light L2 collected by the second camera 50.

With the above configuration, the voice coil motor 80 can adjust the focal length of the first camera 40, so that the structured light projector 100 emits the output light L1 with complete speckled pattens onto the to-be-tested object 200. A utilization rate of the output light L1 is high, and the power consumption is reduced, thereby reducing, or using more efficiently, the power consumption caused by the limitation of the distance between the to-be-tested object 200 and the projector 100. The focal length of the first camera 40 can be adjusted, that is, the distance between the first camera 40 and the to-be-tested object 200 can be adjusted, which improves an accuracy of the structured light projector 100. Data as to current applied to the voice coil motor 80 can be used to determine the depth of the to-be-tested object 200. Then, the three-dimensional data of the to-be-tested object 200 can be obtained based on the two-dimensional data and the depth data.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A structured light projector, comprising:
   a lens comprises a first surface and a second surface opposite to the first surface;
   an infrared laser source disposed on the first surface and configured to emit infrared light;
   a voice coil motor disposed on the second surface;
   a first camera movably accommodated in the voice coil motor and disposed on a transmission path of the infrared light, the infrared light configured to irradiate a to-be-tested object through the first camera and reflected by the to-be-tested object to form reflected light; and
   a second camera disposed on the second surface;
   wherein the voice coil motor is configured to adjust a focal length of the first camera, the second camera is configured to receive the reflected light, so that the structured light projector obtains three-dimensional information of the to-be-tested object based on the reflected light.

2. The structured light projector of claim 1, further comprising a photosensitive chip, wherein the photosensitive chip is disposed on the first surface, and on the transmission path of the reflected light.

3. The structured light projector of claim 2, further comprising a processing chip disposed between the first surface and the processing chip.

4. The structured light projector of claim 2, wherein the photosensitive chip is a complementary metal oxide semiconductor sensor.

5. The structured light projector of claim 1, further comprising a diffractive optical element, wherein the diffractive optical element is disposed in the voice coil motor, and between the first camera and the second surface.

6. The structured light projector of claim 1, wherein the first surface is parallel to the second surface.

7. The structured light projector of claim 6, wherein the lens defines a cavity, the lens comprises a first mirror surface and a second mirror surface at the cavity, an angle between the first mirror surface and the first surface is 45 degrees, and the second mirror surface is parallel to the first mirror surface.

8. The structured light projector of claim 7, wherein the lens further comprises a third mirror surface and a fourth mirror surface at the cavity, an angle between the third mirror surface and the second surface is 45 degrees, and the fourth mirror surface is parallel to the second mirror surface.

9. The structured light projector of claim 1, further comprising a circuit board, wherein the circuit board is electrically connected to the infrared laser source, the first camera, the voice coil motor, and the second camera.

10. The structured light projector of claim 1, further comprising an infrared filter disposed between the second camera and the lens.

* * * * *